United States Patent
Yebka et al.

(10) Patent No.: US 9,740,252 B2
(45) Date of Patent: Aug. 22, 2017

(54) THERMAL CONDUCTION MATRIX

(71) Applicant: Lenovo (Singapore) Pte. Ltd., Singapore (SG)

(72) Inventors: Bouziane Yebka, Apex, NC (US); Joseph Anthony Holung, Wake Forest, NC (US); Tin-Lup Wong, Chapel Hill, NC (US); Philip John Jakes, Durham, NC (US); Joseph David Plunkett, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 514 days.

(21) Appl. No.: 14/109,774

(22) Filed: Dec. 17, 2013

(65) Prior Publication Data

US 2015/0169015 A1  Jun. 18, 2015

(51) Int. Cl.
| | |
|---|---|
| *G06F 1/20* | (2006.01) |
| *G06F 1/16* | (2006.01) |
| *H01M 10/625* | (2014.01) |
| *H01M 10/623* | (2014.01) |
| *H01M 10/66* | (2014.01) |
| *H01M 10/655* | (2014.01) |
| *H01M 10/613* | (2014.01) |
| *H01M 10/0525* | (2010.01) |

(52) U.S. Cl.
CPC ............ *G06F 1/203* (2013.01); *G06F 1/1635* (2013.01); *H01M 10/613* (2015.04); *H01M 10/623* (2015.04); *H01M 10/625* (2015.04); *H01M 10/655* (2015.04); *H01M 10/66* (2015.04); *H01M 10/0525* (2013.01); *H01M 2220/20* (2013.01); *H01M 2220/30* (2013.01); *Y02E 60/122* (2013.01)

(58) Field of Classification Search
CPC .... G06F 1/203; G06F 1/635; H01M 10/0525; H01M 10/625; H01M 10/623; H01M 10/66; H01M 10/655; H01M 10/613
USPC ...................... 429/120, 94, 231.95
See application file for complete search history.

(56) References Cited

U.S. PATENT DOCUMENTS

| | | | | |
|---|---|---|---|---|
| 2002/0164483 | A1* | 11/2002 | Mercuri | B32B 18/00 428/408 |
| 2011/0158653 | A1* | 6/2011 | Mazed | H04B 10/272 398/140 |
| 2013/0136966 | A1* | 5/2013 | Bhardwaj | H05K 7/20481 429/94 |
| 2014/0060087 | A1* | 3/2014 | Choi | H01L 35/16 62/3.7 |

OTHER PUBLICATIONS

BASF, Phase Change Materials, May 28, 2008 (35 pages).

(Continued)

*Primary Examiner* — Helen O Conley
(74) *Attorney, Agent, or Firm* — Brian J. Pangrle

(57) ABSTRACT

A system can include a processor; memory operatively coupled to the processor; lithium-ion battery cells to power at least the processor and the memory; and a thermal conduction matrix that includes crystalline carbon formations that distribute heat energy generated by the lithium-ion battery cells. Various other apparatuses, systems, methods, etc., are also disclosed.

20 Claims, 11 Drawing Sheets

(56) References Cited

OTHER PUBLICATIONS

Deshmukh et al., Thermal stresses induced by a point heat source in a circular plate by quasi-static approach, Theoretical & Applied Mechanics Letters, 1, 031007, 2011 (3 pages).
Stankovich et al., Graphene-based composite materials, Nature, vol. 442, Jul. 20, 2006 (5 pages).
Park et al., The effect of concentration of graphene . . . , Carbon 50, 2012, pp. 4573-4578 (6 pages).
Battery University, How to Prolong Lithium-based Batteries, http://batteryuniversity.com/learn/article/how_to_prolong_lithium_based_batteries, Oct. 2010 (3 pages).
Liu, Effects of temperature-dependent material properties on stress and temperature . . . , World Academy of Sceince, Engineering and Technology, 41, 2010, pp. 474-479 (6 pages).

\* cited by examiner

US 9,740,252 B2

THERMAL CONDUCTION MATRIX

TECHNICAL FIELD

Subject matter disclosed herein generally relates to thermal conduction technologies.

BACKGROUND

Electrically powered equipment and equipment that may store electrical energy may generate heat, be sensitive to heat, may benefit from heat, etc. Various technologies and techniques described herein pertain to heat transfer.

SUMMARY

A system can include a processor; memory operatively coupled to the processor; lithium-ion battery cells to power at least the processor and the memory; and a thermal conduction matrix that includes crystalline carbon formations that distribute heat energy generated by the lithium-ion battery cells. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
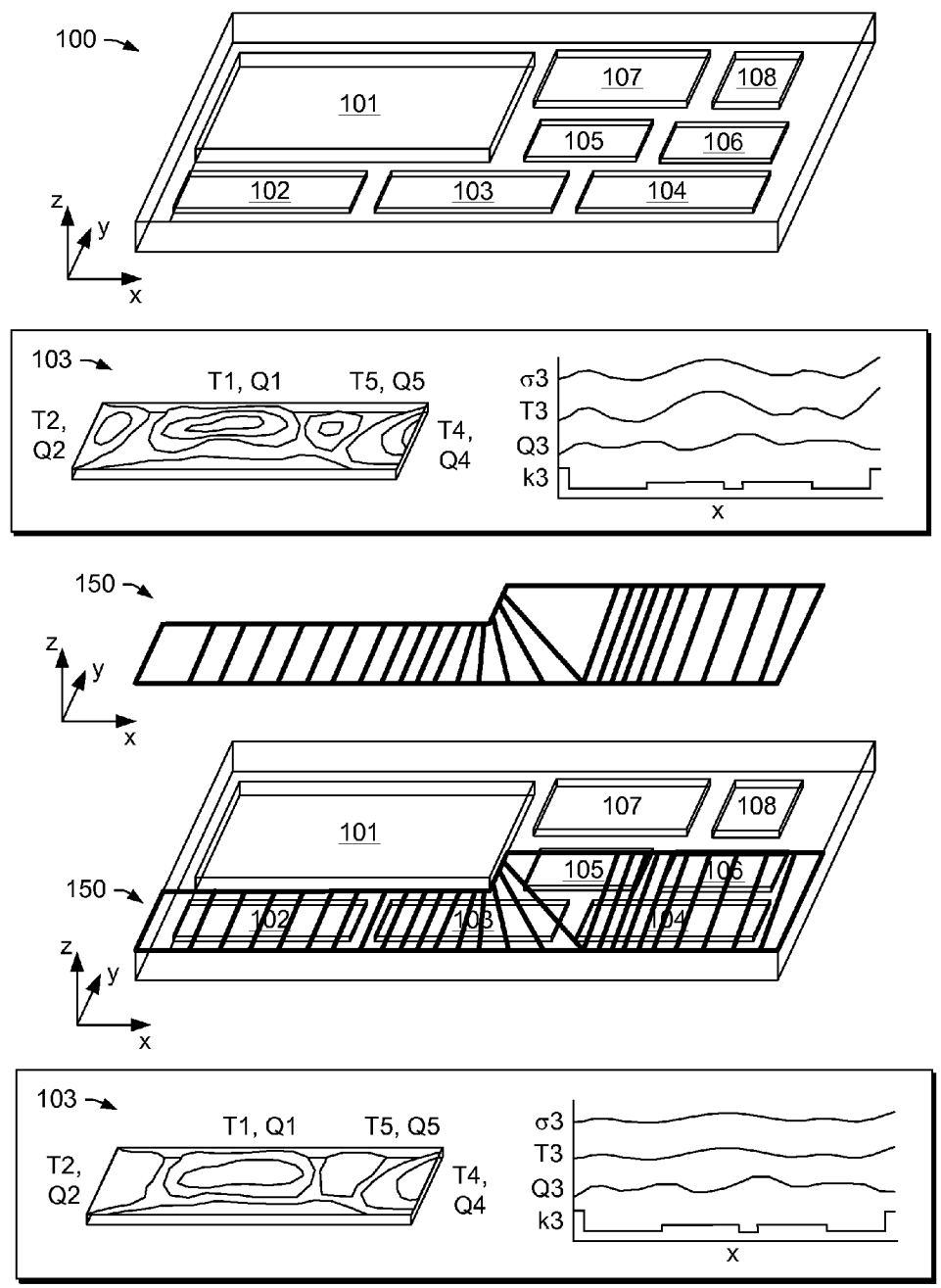
FIG. 1 is a diagram of examples of a device with and without a thermal conduction matrix.

FIG. 1 shows an example of a device 100 that includes various components 101, 102, 103, 104, 105, 106, 107 and 108. As an example, one or more of the components 101 to 108 may include circuitry. As an example, one or more of the components 101 to 108 may include mechanical features. As an example, one or more of the components 101 to 108 may include chemical features. As an example, one or more of the components 101 to 108 may include one or more of circuitry, mechanical features and chemical features. As an example, a component may be an integrated circuit. As an example, a component may be a heat sink. As an example, a component may be a fan. As an example, a component may be an electrochemical cell or cells. While the various components 101 to 108 are illustrated as being substantially rectangular and as including a height in a Cartesian coordinate system (x, y, z), one or more of the components may have or include another shape or shapes.

As an example, a component may have an aspect ratio defined by a height with respect to a planar dimension or dimensions that may be of the order of about 0.1 or less. As an example, a component may be approximated as a thin plate, for example, to determine one or more characteristics as to how the component may behave when subject to heating, cooling or heating and cooling. As an example, a component may be heated, cooled or heated and cooled in response to mechanisms associated with the component itself. For example, a circuit that has resistance may generate heat energy in response to current (e.g., Joule heating). As another example, an electrochemical cell may include endothermic and/or exothermic reactions. For example, a lithium-ion cell may experience endothermy due to de-intercalation of lithium ions from a lattice and exothermy due to phase transition of oxide crystals. As an example, a lithium-ion cell may exhibit endothermic cooling in an initial part of a charge cycle (e.g., indicator of entropy change) and, for example, during a discharge portion of a cycle, a lithium-ion cell may be exothermic. As yet another example, a component may include a mover, for example, to move fluid (e.g., a fan, a pump, etc.).

As an example, a component may be sensitive to a rate such as the rate at which temperature changes at a location or locations. As an example, a component may include one or more materials that expand in response to an increase in temperature (e.g., or contract in response to an increase in temperature; consider water, pure silicon, etc.). As an example, as to a material, its degree of expansion divided by a change in its temperature may be characterized by a coefficient of thermal expansion, which may depend on temperature. As an example, a coefficient of thermal expansion may pertain to linear, area or volumetric expansion. As an example, a material may be characterized in part by a thermal strain, for example, consider a linear change in length of a rod or a long plate that occurs due to a change in temperature. Another characteristic of a material is thermal conductivity, which may be in units of watts per meter per degree Kelvin and which may depend on temperature. As an example, a material of high thermal conductivity may be a considered a thermal conductor and a material of low thermal conductivity may be considered a thermal insulator (e.g., a thermal resistor). As an example, one or more properties of a material may be isotropic or anisotropic. For example, a material with an anisotropic structure may include linear expansion coefficients that differ by direction.

As an example, a component may experience stress in response to heating, cooling or heating and cooling. As an example, a component may warp (e.g., reversibly or irreversibly) in response to heating, cooling or heating and cooling. As an example, an article by Deshmukh et al., entitled "Thermal stresses induced by a point heat source in a circular plate by quasi-static approach" (Theoretical &

Applied Mechanics Letters 1, 031007, 2011), which is incorporated herein by reference, describes thermal stresses for a circular plate.

As an example, FIG. 1 shows various plots for the component 103, including a temperature contour plot and a plot of thermal conductivity (k3), energy generation (Q3), temperature (T3) and stress (σ3) with respect to a dimension x. As indicated, the component 103 may generate heat energy and may do so in a manner that is uneven with respect to its volume. For example, as indicated by a series of contours, the component 103 may include a hot spot. As an example, the hot spot may be a substantially steady-state hot spot or may be a transient hot spot. Such a hot spot may lead to a rise in temperature, which, in turn, may lead to stress. As an example, the integrity, functionality, etc. of the component 103 may be compromised by temperature, a temperature rise, a temperature-time profile, etc. As an example, temperature may cause a reaction to increase and, where temperature distribution is uneven, temperature may cause local disturbances in reactions (e.g., kinetics, thermodynamics, etc.). As an example, stress, strain, chemical, electrical, etc. changes that may occur with respect to temperature, especially uneven temperatures, may impact performance, longevity, etc. of a component.

FIG. 1 shows an example of a thermal conduction matrix 150 that includes conductive material. As an example, the thermal conduction matrix 150 may be part of the device 100 and may conduct heat energy in a manner that causes the component 103 to experience lesser temperatures, lesser temperature-time gradients, lesser temperature-spatial gradients, etc. For example, as shown in FIG. 1, the thermal conduction matrix 150 may diminish the intensity of the hot spot of the component 103 and, for example, diminish stress and a temperature differential across the component 103. As an example, where a thermal conductivity for a material is temperature dependent, a lesser temperature differential may result in a more uniform thermal conductivity for a component formed by the material (e.g., or a portion of a component formed by the material).

Figure 2:
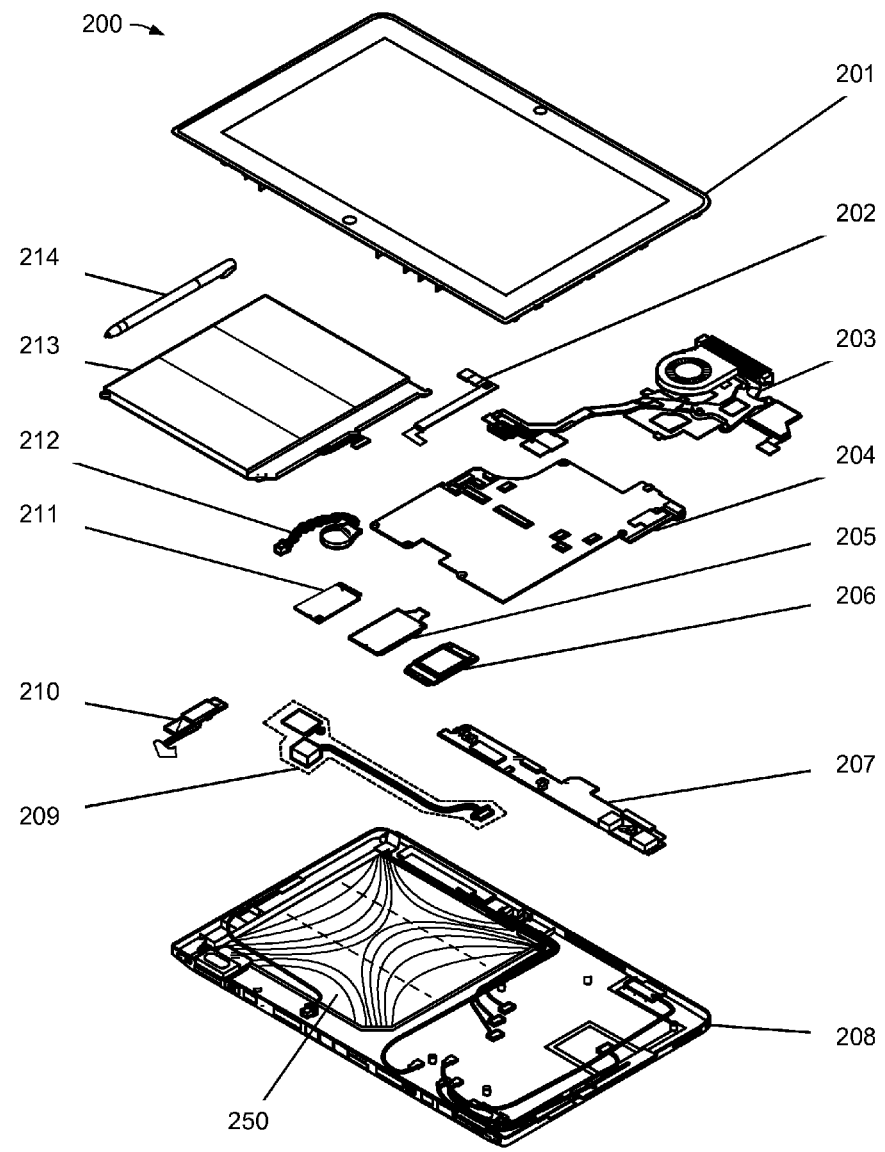
FIG. 2 is a diagram of an example of a device that includes a thermal conduction matrix.

FIG. 2 shows an example of a device 200 that includes an LCD assembly 201, a camera assembly 202, a fan assembly 203, a board 204 (e.g., a circuit board, a system board, a motherboard, etc.), a wireless WAN card 205, a wireless LAN card 206, an I/O board 207, a cover assembly 208, a DC cable assembly 209, a communication card 210, a solid-state drive 211, a battery package 213, a stylus 214 and a thermal conduction matrix 250. In the example of FIG. 2, the board 204 may include a processor and memory, which may be configured to store instructions accessible by the processor and, for example, executable by the processor to perform one or more tasks.

In the example of FIG. 2, the battery package 213 may include multiple cells. For example, the battery package 213 may include three sets of cells (e.g., or three cells) such that one is in the middle and surrounded by two others (e.g., two neighbors). In such an example, the middle set of cells (e.g., or cell) may differ with respect to heat transfer when compared to its neighbors. For example, the middle set of cells (e.g., or cell) may be exothermic during discharge and generate heat energy that cannot be as effectively transferred as heat energy generated by its neighbors (e.g., which may have greater surface area facing a medium or media that can accept heat energy). In the example of FIG. 2, the thermal conduction matrix 250 includes thermal conductors that can transfer heat energy from the middle set of cells (e.g., or cell) outwardly away from the middle set of cells (e.g., or cell). In such an example, the thermal conduction matrix 250 may act to distribute heat energy such that all of the cells in the battery package 213 experience a more uniform temperature, which may be more uniform in time, space and/or time and space.

As an example, capacity of a cell may depend on its environment; thus, the thermal conduction matrix 250 may act to even out the environment experienced by associated cells and thereby maintain the associated cells at relatively even capacities (e.g., storage capacities). In contrast, where one cell of an associated group of cells experiences a harsher environment, that cell may control the capacity, operation, etc. of the group of cells. For example, if that one cell fails, the entire group of cells may need to be replaced, even though other cells in the group of cells may still be useful. As to mechanisms that may diminish capacity, consider as some examples, uneven chemical reactions due to uneven temperature, faster or slower chemical reactions due to higher or lower temperature, uneven stress or higher stress (e.g., and strain) due to uneven or higher temperature, etc.

In the example of FIG. 2, the device 200 may include one or more thermal conduction matrixes. As an example, a thermal conduction matrix may act to direct heat energy toward the fan assembly 203, for example, to remove heat energy from the device 200. As an example, a thermal conduction matrix may be included that acts to direct heat energy from a processor of the board 204 away from the battery package 213. For example, a thermal conduction matrix may be disposed between the battery package 213 and the board 204 where the thermal conduction matrix includes anisotropic thermal conductivity (e.g., a thermal resistor or insulator sidewise and a thermal conductor lengthwise). As an example, the thermal conduction matrix 250 may include one or more materials with anisotropic thermal conductivities.

Figure 3:
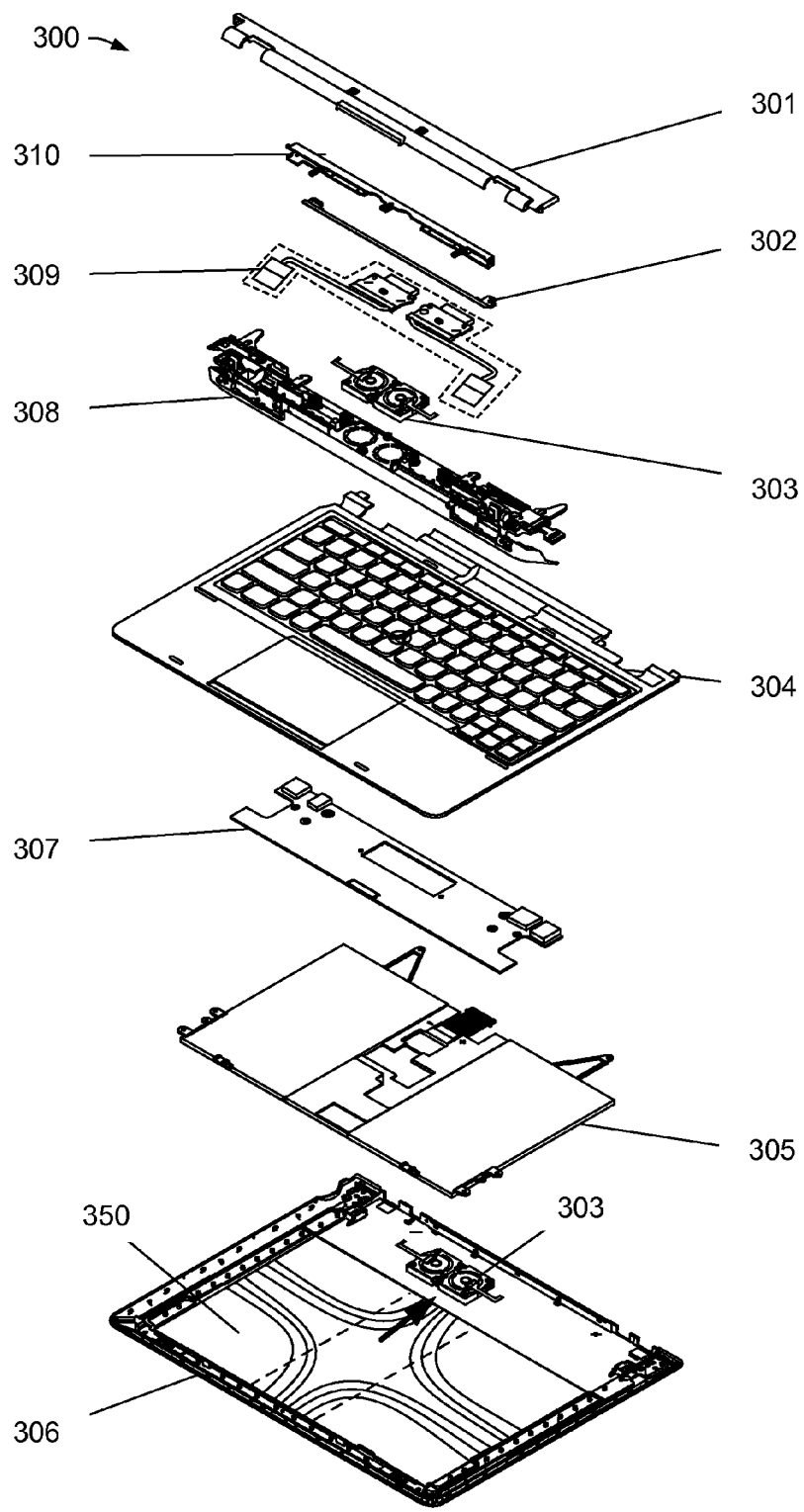
FIG. 3 is a diagram of an example of a device that includes a thermal conduction matrix.

FIG. 3 shows an example of a device 300. As an example, the device 300 may be operatively coupled to the device 200. In the example of FIG. 3, the device 300 includes a cover and hinge assembly 301, a link structure 302, a fan assembly 303, a keyboard assembly 304, a battery package 305, a base cover 306, an I/O board 307, a hinge assembly 308, connectors 309, a connectors cover 310, and a thermal conduction matrix 350.

In the example of FIG. 3, the battery package 305 may include multiple cells. For example, the battery package 305 may include two sets of cells (e.g., or two cells). In such an example, a middle portion of each set of cells (e.g., or each cell) may differ with respect to heat transfer when compared to more exterior portions. For example, a set of cells (e.g., or cell) may have a hot spot near its middle. In the example of FIG. 3, the thermal conduction matrix 350 includes thermal conductors that can transfer heat energy from a middle of each set of cells (e.g., or cell) outwardly away and, for example, toward the fan assembly 303. In such an example, the thermal conduction matrix 350 may act to distribute heat energy such that each of the cells in the battery package 305 experiences a more uniform temperature, which may be more uniform in time, space and/or time and space.

As an example, capacity of a cell may depend on its environment; thus, the thermal conduction matrix 350 may act to even out the environment experienced by each cell (e.g., in an associated group of cells) and thereby enhance performance, longevity, etc. In contrast, where a cell experiences a harsher environment and/or a less uniform environment, that cell may control the capacity, operation, etc. of a group of cells. For example, if that one cell fails, the entire group of cells may need to be replaced. As to mechanisms that may diminish capacity, consider as some examples, uneven chemical reactions due to uneven temperature, faster or slower chemical reactions due to higher or lower temperature, uneven stress or higher stress (e.g., and strain) due to uneven or higher temperature, etc.

In the example of FIG. 3, the device 300 may include one or more thermal conduction matrixes. As an example, a thermal conduction matrix may include one or more materials with anisotropic thermal conductivities.

Figure 4:
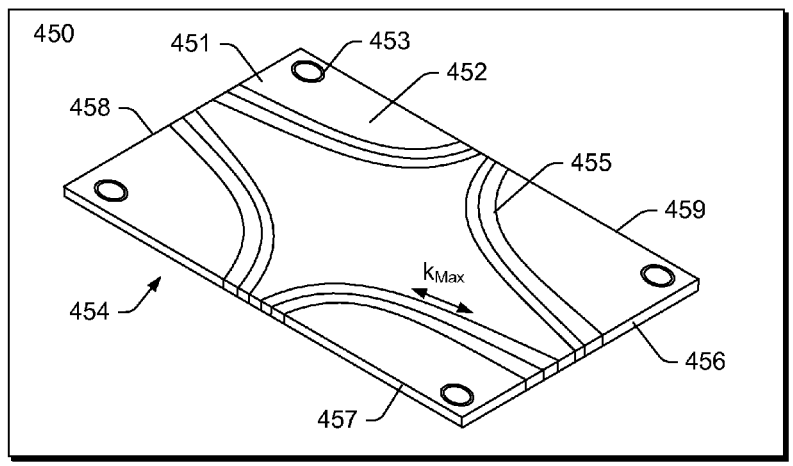
FIG. 4 is a diagram of an example of a thermal conduction matrix.
Figure 4:
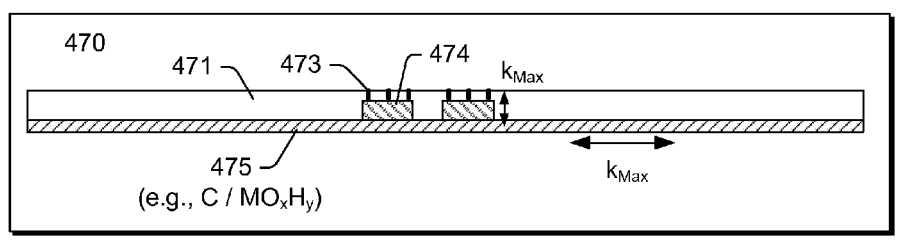
Figure 4:
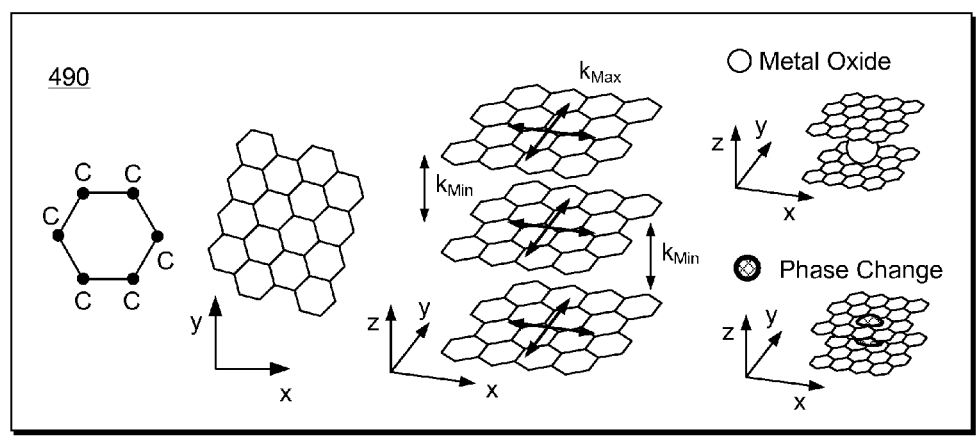

FIG. 4 shows an example of a thermal conduction matrix 450, an example of a thermal conduction matrix 470 and some examples of structures that include carbon 490. In FIG. 4, the thermal conduction matrix 450 includes a body 451 that includes surfaces 452, 454, 456, 457 and 459 and thermally conductive material 455 and optional anchor features 453. In the example of FIG. 4, the thermal conduction matrix 450 is anisotropic, for example, where thermal conduction may be maximal along lengths of the thermally conductive material 455. As an example, the thermally conductive material 455 may be, at least in part, anisotropic with respect to its thermal conduction coefficients.

In the example of FIG. 4, the thermal conduction matrix 470 includes a body 471 that includes one or more materials 473 and 474 oriented and/or positioned for heat transfer maximally in particular directions. For example, the material 473 may be positioned to transfer heat energy to the material 474, which may be positioned to transfer heat energy to material 475. As an example, the material 475 may be a continuous layer of material that may optionally provide for structural integrity and thermal conduction. As an example, the material 475 may include graphene. As an example, the material may include graphene and a metal oxide bound via hydrogen bonds to the graphene. As an example, the material 475 may be or include graphene paper. As an example, the material 475 may include embedded material such as, for example, embedded phase change material.

In graphene, carbon atoms may be arranged in a hexagonal manner, due to $sp^2$ bonding, as a crystalline allotrope of carbon (e.g., as a large aromatic molecule). Graphene may be described as being a one-atom thick layer of graphite and may be a basic structural element of carbon allotropes such as, for example, graphite, charcoal, carbon nanotubes and fullerenes.

In FIG. 4, the structures 490 may include a layer of graphene or layers of graphene, which may be described, for example, with respect to a Cartesian coordinate system (x, y, z). As an example, as shown, a structure may optionally include a metal oxide and/or a phase change material. As shown in FIG. 4, the thermal conductivity of graphene, when structured as layers, may be greater in the x,y-plane than in the z-direction. As an example, layers of graphene may be bonded via a metal oxide and hydrogen, for example, magnesium oxide may bind to graphene via hydrogen atoms.

As an example, a thermal conduction matrix may include a phase change material, for example, that may be able to absorb and/or release latent heat. As an example, a phase-change microcapsule may be used that includes a phase change material within a coating (e.g., encapsulated phase change material). As an example, consider a paraffin-based (e.g., wax) microcapsule where melting and solidification occur at a desired melting point temperature (e.g., about 27 degrees C. or more, depending on particular component, components, uses, etc.). In such an example, heat energy may be absorbed to melt the paraffin. In such an example, heat energy may be absorbed when temperature starts to increase above the melting point, which may help maintain temperature (e.g., diminish temperature differentials in space and/or time). In such an example, heat energy stored in a microcapsule's liquid paraffin may be released as the paraffin solidifies. Thus, a phase change material may act to damp temperature swings (e.g., to damp temperature differentials in space and/or time).

As an example, Micronal material (BASF AG, Ludwigshafen, Germany) may be implemented, for example, where microscopic wax droplets are disposed inside hard acrylic polymer shells. As an example, phase change material may be about 2 micron to about 20 micron in size. As an example, BASF manufactures and markets Micronal DS 5000 X, a dispersion of microcapsules in water, and Micronal DS 5001 X, a dry powder.

As an example, a phase change material may be included in an amount that may depend on a desired outcome. For example, where gradients in temperature with respect to time are to be damped, an amount of phase change material may be selected to provide desired damping. As an example, a thermal conduction matrix may include different types, amounts, etc. of phase change material. For example, a thermal conduction matrix may be tailored to a particular application by using phase change materials with different melting temperatures. In such an example, the phase change materials may exist within a common region (e.g., "overlap"), exist in different regions, etc. Where different types of phase change materials are implemented, damping in temperature changes may occur about different temperatures. For example, consider a phase change material with a melting temperature of about 35 degrees C. and another phase change material with a melting temperature of about 45 degrees C. As an example, such phase change materials may be disposed within a thermal conduction matrix to damp temperature changes as to one or more components.

As an example, a process may include providing graphene (e.g., or other material that may include carbon), providing hydrogen bonding material and forming a matrix. As an example, a process may include providing graphene (e.g., or other material that may include carbon), providing phase change material and forming a matrix. As an example, a process may include providing graphene (e.g., or other material that may include carbon), providing phase change material, providing hydrogen bonding material and forming a matrix. As an example, a matrix may include one or more microcapsules of phase change material disposed between layers of graphene (e.g., or other material that may include carbon). As an example, heat energy may be transferred to one or more microcapsules. As an example, a microcapsule may penetrate a layer of graphene or layers of graphene such that basal plane thermal conduction may transfer heat energy to the microcapsule for purposes of melting phase change material in the microcapsule and, for example, such that solidification of phase change material in the microcapsule may release heat energy that may be conducted by the basal plane or planes of one or more layers of graphene.

As an example, a basal plane thermal conductivity of a graphene material may be about 1,000 $W \cdot m^{-1} \cdot K^{-1}$ or more (e.g., about 3,000 $W \cdot m^{-1} \cdot K^{-1}$ or more). As to graphite, a so-called c-axis (e.g. out of plane) direction may include a thermal conductivity that is a factor of about 100 or more smaller than a basal plane thermal conductivity, for example, due to weak binding forces between basal planes, larger lattice spacing, etc.

As an example, a thermal conduction matrix may include a material that includes isotropic properties and a material that includes anisotropic properties. For example, a thermally conductive metal or alloy may direct heat energy to a basal plane of a graphene material and, for example, a thermally conductive metal or may allow direct heat energy to another material. In such an example, a thermal conduction chain may be established where a graphene material provides for directional heat conduction in the chain.

Figure 5:
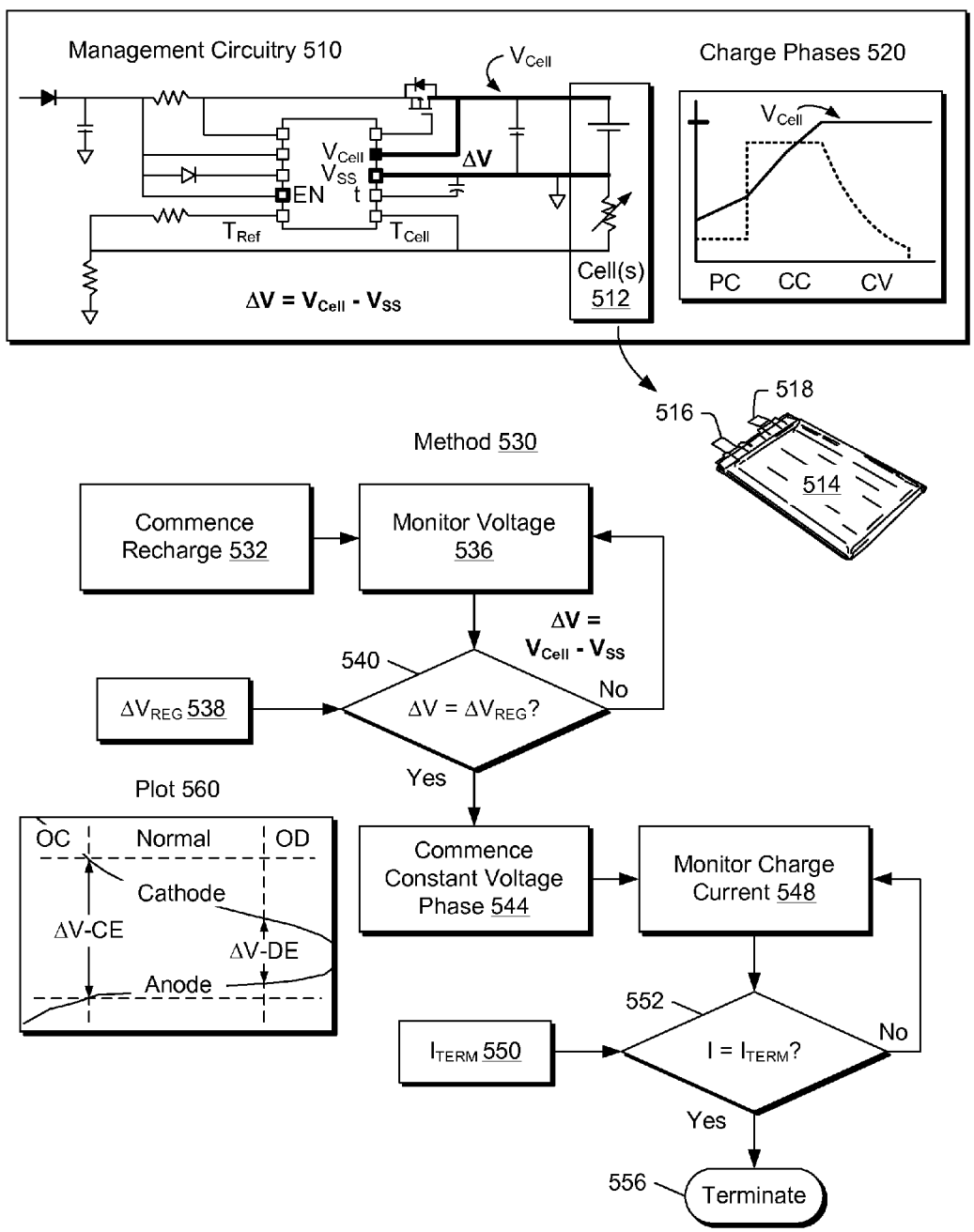
FIG. 5 is a diagram of an example of management circuitry, an example of a package that includes cells and an example of a method.

FIG. 5 shows an example of management circuitry 510 for managing charging of one or more electrochemical cells 512, an example of a package 514 that includes cells, an example charge phase plot 520, an example of a method 530 and an example potential plot 560.

As shown in the example of FIG. 5, management circuitry 510 may include an integrated circuit with about 10 pins. The pins may include charge current sense input, battery management input supply, charge status output, logic enable, cell temperature sensor bias, cell temperature sensor input, timer set, cell management 0 V reference, cell voltage sense, and drive output. As to protection features, a cell temperature sensor bias feature may provide for a voltage reference to bias an external thermistor for continuous cell temperature monitoring and prequalification while a cell temperature sensor input feature may provide for input for an external thermistor for continuous cell temperature monitoring and prequalification (e.g., which optionally may be disabled by applying a set voltage) and safety timers (e.g., preconditioning, fast charge, elapsed time termination, etc.) that may be scaled by a capacitor. A temperature-sensing circuit may have its own reference such that it is immune to fluctuations in the supply voltage input (e.g., where the temperature-sensing circuit is removed from the system when no supply is applied, eliminating additional discharge of cell(s)).

As to logic, a logic enable feature may provide for input that, for example, forces charge termination, initiates charge, clears faults or disables automatic recharge. For example, a logic-enable input pin (EN) may provide for features to terminate a charge anytime during the charge cycle, initiate a charge cycle or initiate a recharge cycle. A logic input (e.g., high or low) may signal termination of a charge cycle.

Also shown in FIG. 5 is an example of a charge phase plot 520 that indicates, as an example, how charging may include a preconditioning phase (PC), a constant current phase (CC) and a constant voltage (CV) phase.

As an example, a cell voltage sense function (e.g., implemented in part via the pin labeled "$V_{Cell}$") may provide for monitoring voltage at, for example, a positive terminal of a cell with respect to a reference that is based on the negative terminal of a cell (see, e.g., the pin labeled $V_{SS}$). Thus, the management circuitry 510 may measure voltage (e.g., ΔV) as a difference between a cathode potential ($V_{cathode}$, as applied at the pin $V_{Cell}$) and an anode potential ($V_{anode}$, as applied at the pin $V_{SS}$). As explained with respect to the method 530, a specified voltage ($\Delta V_{REG}$) may be a limit for ΔV.

Management circuitry may be configured to manage, to varying extent, state-of-charge (SOC) mismatch and capacity/energy (C/E); noting that as the number of cells and load currents increase, the potential for mismatch also increases. Though SOC may be more common, each type of mismatch problem may act to limit capacity (mA·h) of a pack of cells, for example, to capacity of the weakest cell in a pack of cells.

In the example of FIG. 5, the cell(s) 512 may include a polymer composite material (e.g., polyethylene oxide (PEO), polyacrylonitrile, etc.) that includes lithium salt. Such a cell or cells may be referred to as a lithium-ion battery or a lithium-ion polymer battery or a lithium-polymer battery (e.g., "LiPo battery" or "LiPo cell"). LiPo cells are sometimes referred to as laminate cells, which may be configured very thin or quite large depending on their intended use. One or more LiPo cells may be encased in, for example, a flexible aluminum foil laminate pouch (e.g., with a thickness of the order of about 0.1 mm). LiPo cells may include a stacked construction formed by stacking materials that include electrode and electrolyte materials in a flat sandwich (e.g., defined by length, width and height dimensions). Stacked layers may be packed in a package (see, e.g., the package 514 that includes tabs 516 and 518) in a flat, rolled or other configuration. LiPo cell capacities may include capacities in a range, for example of about 50 mA·hrs (e.g., for a small cell such as for a Bluetooth headset) to about 10 A·hrs or more for an electric vehicle (e.g., electric or hybrid).

As to function of a lithium-ion cell, lithium ions move from a negative electrode (e.g., anode) to a positive electrode (e.g., cathode) during discharge and reversely when being charged. As an example, a LiPo cell can include a polyethylene (PE), a polypropylene (PP), a PP/PE, or other material as a separator material. Some LiPo cells may include a polymer gel containing an electrolyte solution, which may be, for example, coated onto an electrode surface (e.g., as a separator material layer). As an example, a continuous layer of material may be provided that carries various materials where the continuous material may be folded to form a stack of materials. As an example, the continuous layer of material may be a separator material in that portions of it are disposed between layers of electrode materials (e.g., to separator anode electrode material from cathode electrode material).

For lithium-ion cells, when cell voltage drops to a low value (e.g., about 1.5 V), reactions at an anode can produce gas (e.g., over-discharge or "OD"). If voltage continues to drop (e.g., under about 1 V), copper of a copper-based anode current collector can start to dissolve and may short out a cell. When cell voltage increases to a high value (e.g., about 4.6 V), gassing may occur at a cathode as electrolyte may start to decompose (e.g., overcharge or "OO"). As an example, a lithium-ion cell or cells may be connected to an external thermal fuse for overcharge protection (e.g., in addition to the control by management circuitry). As to the potential plot 560, it shows a normal operating range that exists between a charge end voltage (ΔV-CE) and a discharge end voltage (ΔV-DE). In the example of FIG. 5, the normal range lies between an overcharge region (OC) and an over-discharge region (OD). As mentioned, damage can occur in either of these regions.

As to the example method 530 of FIG. 5, it pertains to recharging one or more lithium-ion cells such as the cell(s) 512, for example, using circuitry such as the management circuitry 510 and achieving charge phases such as those of the charge phase plot 520.

As shown in FIG. 5, the method 530 commences in a commencement block 532 for commencing a recharge of one or more cells. The commencement block 532 can initiate a preconditioning (PC) phase and, thereafter, a constant current (CC) phase. A monitor block 536 follows for monitoring voltage of the one or more cells during a constant current (CC) phase. A decision block 540 relies on monitoring of the voltage for comparison to a specified voltage ($\Delta V_{REG}$). The decision block 540 provides for deciding when the recharge process should terminate the constant current (CC) phase and commence a constant voltage (CV) phase.

The decision block 540 may receive a value for the specified voltage ($\Delta V_{REG}$) from one or more storage registers 538 for storing one or more values for the specified voltage ($\Delta V_{REG}$). In the example of FIG. 5, the one or more storage registers 538 may store a value such as 4.1 V, 4.2 V, 8.2 V, 8.4 V, etc. (e.g., as one or more preset voltage regulation options). The value or values stored in the one or more storage registers 538 may depend on characteristics of a cell or cells or number of cells. In the example of FIG. 5, the specified value ($\Delta V_{REG}$) may be based on the maximum voltage that a particular lithium-ion cell (or cells) can reach during charging as to prevent overcharge side reactions at a positive electrode and material phase changes in a positive electrode. As some examples, consider a $LiCoO_2$ cathode material with a maximum operational potential of about 4.2 V and a $LiMnO_4$ cathode material with a maximum operational potential of about 4.3 V.

In the example of FIG. 5, the management circuitry 510 may reference inputs and outputs with respect to a management circuit reference potential ($V_{SS}$) that may be intended to be a 0 V reference potential. In the circuitry 510, one of the pins, labeled $V_{SS}$, is electrically connected to the "negative" electrode of the cell(s) 512. Specifically, it is electrically connected with the anode(s) of the cell(s) 512 (e.g., via collector material). Accordingly, in the method 530, the voltage monitored by the monitoring block 536 (e.g., at the pin labeled $V_{Cell}$) is measured with respect to the negative electrode (i.e., anode(s)) of the cell(s) 512 (e.g., applied to the pin labeled $V_{SS}$). Such an approach relies on an assumption that the negative electrode (e.g., anode(s)) of the cell(s) 512 (e.g., $V_{SS}$) has a potential of approximately 0 V and remains at approximately 0 V. Under such an assumption, the condition of the decision block 540 may be met when $V_{Cell}-V_{SS}=\Delta V_{REG}$. However, should changes occur to the cell(s) 512, the potential of the anode may not remain constant. For example, if the potential of the anode increases, then the potential at the pin labeled $V_{SS}$ of the management circuitry 510 will increase as well. Under such conditions, to meet the criterion specified by $\Delta V_{REG}$, the potential of the cathode must be higher as applied to the pin labeled $V_{Cell}$ of the management circuitry 510. Depending on the amount of increase in potential of the anode, the potential of the cathode may exceed a recommended upper limit for the cathode.

As shown in the example of FIG. 5, the method 530 continues to the commencement block 544 for commencing a constant voltage (CV) phase when the decision block 540 decides that the monitored voltage (e.g., $\Delta V=V_{Cell}-V_{SS}$) is equal to the specified voltage (e.g., $\Delta V_{REG}$).

For the constant voltage (CV) phase, the method 530 continues in a monitor block 548 for monitoring charge current, which may decline with respect to time as shown in the charge phase plot 520. As shown, another decision block 552 provides for deciding when the constant voltage (CV) phase should terminate. For example, a storage register 550 may store a value for a termination current $I_{TERM}$. In such an example, the decision block 552 may receive the $I_{TERM}$ value from the storage register 550 and compare it to a monitored current value from the monitor block 548. As the monitored current diminishes during the constant voltage (CV) phase, it eventually reaches the $I_{TERM}$ value, upon which the method 530 terminates in a termination block 556 (e.g., to terminate the recharge process commenced at block 532).

As an example, a lithium-ion cell may be impacted by temperature. For example, exposing a lithium-ion cell to a temperature of about 30 degrees C. may cause capacity loss, especially where the cell is also at a high SOC (e.g., voltage above about 4.10V per cell). As an example, capacity lost due to elevated temperature may be unrecoverable. As mentioned, various types of mismatch may act to limit capacity (mA·h) of a pack of cells, for example, to capacity of the weakest cell. Thus, where one cell experiences a temperature, temperatures, temperature-time profile, etc. that differs from one or more other cells (e.g., associated cells), overall capacity of the cells may be diminished. As an example, storage of a pack of cells for one year at about 25 degrees C. at about 100% SOC may result in about an 80% recoverable capacity, storage of a pack of cells for one year at about 40 degrees C. at about 100% SOC may result in about an 65% recoverable capacity, and storage of a pack of cells for three months at about 60 degrees C. at about 100% SOC may result in about an 60% recoverable capacity. As an example, for about a 40% SOC, storage of a pack of cells for one year at about 40 degrees C. may result in about an 85% recoverable capacity.

As an example, a lithium-ion cell may include a material such as polyethylene. In such an example, the material may be a separator material disposed between cathode material and anode material. As an example, separator material may be a microporous polyethylene membrane separator capable of responding to elevated temperatures by melting, for example, to diminish size, number, etc. of micropores to thereby diminish transport of one or more ionic species. As an example, a melting point of a separator material may be about 100 degrees C.

As an example, a thermal conduction matrix may be included in a device, for example, to conduct heat energy (e.g., and/or absorb and/or release heat energy) in a manner that may diminish temperature, diminish temperature differentials, etc. For example, a thermal conduction matrix may diminish spatial temperature differentials across one or more cells. Such an approach may help to retain recoverable capacity of one or more of the cells. As an example, such an approach may even out recoverable capacity, for example, to extend lifetime of a group of cells (e.g., where, otherwise, one of the cells may limit lifetime of the group of cells). As an example, a pack of cells may be provided in a pouch that includes one or more thermal conduction matrixes. As an example, a pack of cells may be provided in a pouch to which one or more thermal conduction matrixes are coupled thereto (e.g., via an adhesive, etc.).

As an example, a thermal conduction matrix may act to avoid a temperature hot spot that may risk melting of a separator material (e.g., at a location of the hot spot). As an example, a hot spot may be due to a cell or, for example, due to heat transferred to the cell. For example, if a cell (e.g., or cells) are located proximate to a heat source, heat energy from the heat source may cause an increase in temperature that may risk melting of a separator material of the cell (e.g., or cells). In such an example, a thermal conduction matrix may transfer heat energy in a manner that reduces such risk optionally where transfer of heat energy may include absorption of heat energy via a phase change material or phase change materials. As an example, a thermal conduction matrix may include thermally conductive material (e.g., which may be anisotropic) and thermally resistive material (e.g., thermally insulative). As an example, a thermal conduction matrix may include material that is thermally conductive in one direction and thermally insulative in another direction. As an example, a thermal conduction matrix may include a region or regions where thermal conduction may differ depending on direction of a thermal gradient. For example, a crystalline carbon material (e.g., a graphene material, etc.) may include a thermal conductivity in one direction that is about of an order of magnitude (e.g., or more) greater than in another direction.

Figure 6:
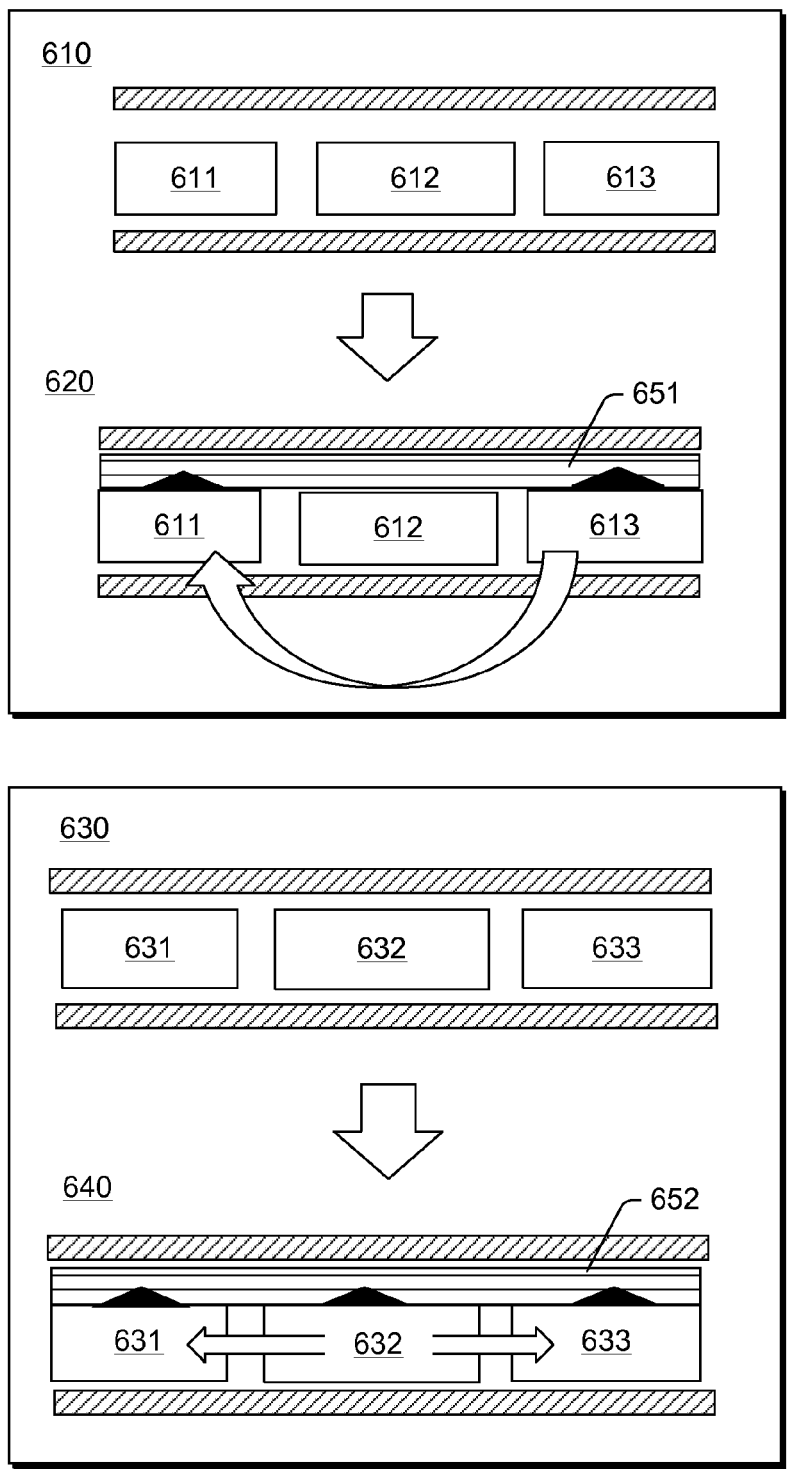
FIG. 6 is a diagram of examples of devices that include a thermal conduction matrix.

FIG. 6 shows various examples of various devices 610, 620, 630 and 640 where the devices 620 and 640 include a thermal conduction matrix 651 and 652, respectively. As shown, the device 610 may include components 611, 612 and 613 where the component 613 may generate heat energy. As an example, the component 611 may be a heat sink. As shown in the example device 620, which includes the thermal conduction matrix 651, heat energy generated by the component 613 may be transferred to the component 611, for example, via the thermal conduction matrix 651 and in a manner that substantially bypasses the component 612, which may be heat sensitive.

As shown in FIG. 6, the device 630 may include components 631, 632 and 633 where the component 633 may generate heat energy. As an example, the device 630 may operate more effectively (e.g., performance, longevity, etc.) where heat energy of the component 633 may be managed, for example, to avoid overheating of the component 633 (e.g., elevated temperature, temperature-time profile, etc.). As shown in the example device 640, which includes the thermal conduction matrix 652, heat energy generated by the component 633 may be transferred to the components 632 and 631, for example, via the thermal conduction matrix 652 and in a manner that acts to more evenly distribute heat energy (e.g., such that the components 631, 632 and 633 are subject to a more uniform environment).

Figure 7:
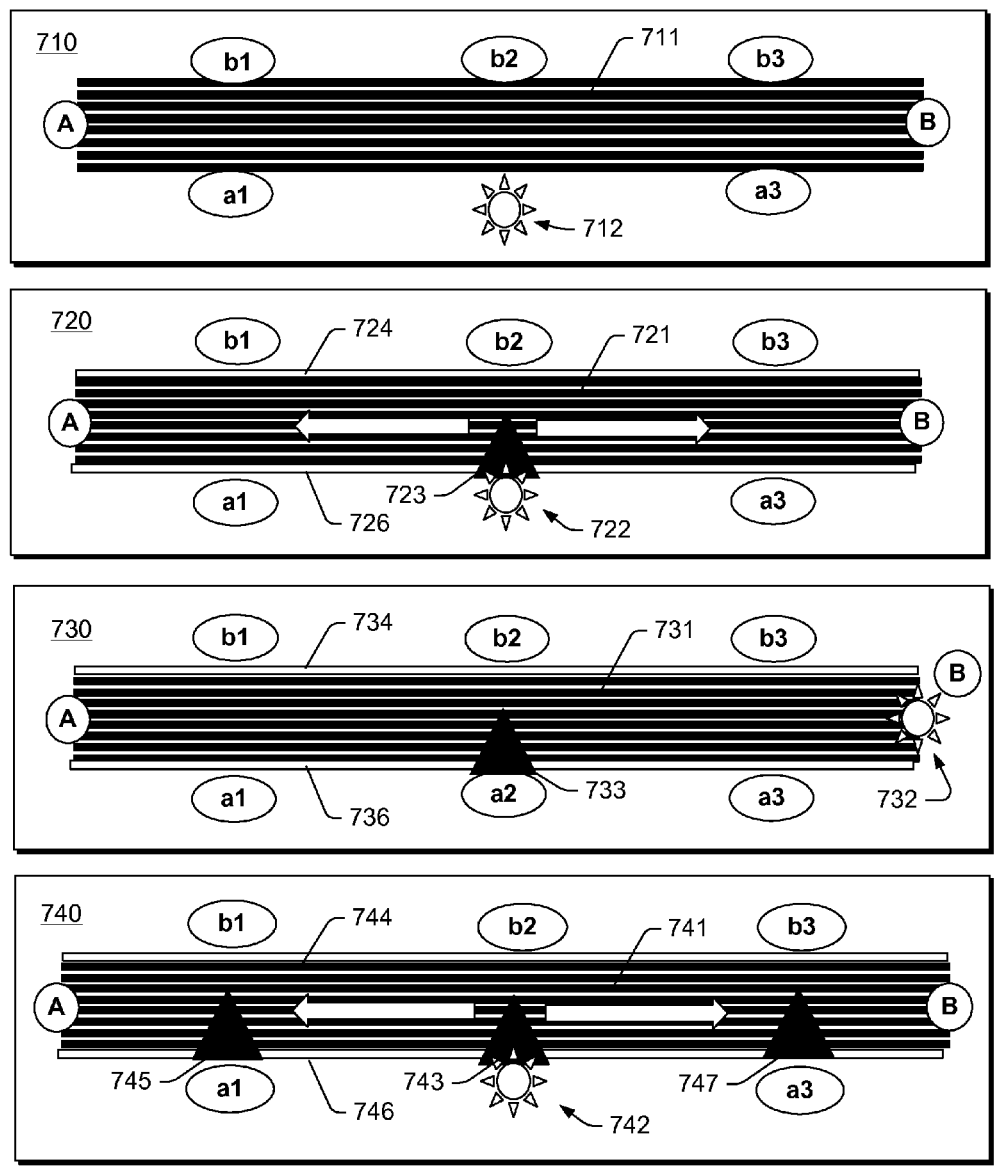
FIG. 7 is a diagram of examples of arrangements and thermal conduction matrixes.

FIG. 7 is a diagram of examples of arrangements 710, 720, 730 and 740 where each includes at least one thermal conduction matrix. In the arrangement 710, various components a1, a3, b1, b2 and b3 are arranged along an upper side and a lower side of a thermal conduction matrix 711 with ends A and B and a heat source 712 exists along the lower side of the thermal conduction matrix 711. In such an example, the thermal conduction matrix 711 may be anisotropic with respect to its thermal conductivity, for example, such that the components a1, a3, b1, b2 and b3 are shielded from the heat source 712.

In the arrangement 720, various components a1, a3, b1, b2 and b3 are arranged along an upper side and a lower side of a thermal conduction matrix 721 with ends A and B and a heat source exists 722 along the lower side of the thermal conduction matrix 721 that is thermally coupled to the thermal conduction matrix 721, for example, via a thermally conductive material 723. In such an example, the thermal conduction matrix 721 may be anisotropic with respect to its thermal conductivity, for example, such that the components a1, a3, b1, b2 and b3 are shielded from the heat source 722. In such an example, heat energy from the heat source 722 may be directed towards the ends A and B of the thermal conduction matrix 721. As an example, the thermal conduction matrix 721 may be bound by one or more layers of insulation 724 and 726, which may, for example, help to shield the components a1, a3, b1, b2 and b3 from heat energy of the heat source 722.

In the arrangement 730, various components a1, a2, a3, b1, b2 and b3 are arranged along an upper side and a lower side of a thermal conduction matrix 731 with ends A and B and a heat source 732 exists at the end B of the thermal conduction matrix 731. As shown, the component a2 is thermally coupled to the thermal conduction matrix 731, for example, via a thermally conductive material 733. In such an example, the thermal conduction matrix 731 may be anisotropic with respect to its thermal conductivity, for example, such that the components a1, a3, b1, b2 and b3 are shielded from the heat source 732 and where the component a2 may be receive heat energy from the heat source 732 via the thermal conduction matrix 731. In such an example, heat energy from the heat source 732 may be directed towards the end A of the thermal conduction matrix 731 and towards the component a2. As an example, the component a2 may benefit from heat energy, for example, it may benefit from an increase in its temperature. As an example, the thermal conduction matrix 731 may be bound by one or more layers of insulation 734 and 736, which may, for example, help to shield the components a1, a3, b1, b2 and b3 from heat energy of the heat source 732. As an example, a thermally conductive material (e.g., the material 733) may penetrate one or more layers of insulation (e.g., the insulation 734 and/or the insulation 736) to thermally couple a component to a thermal conduction matrix (e.g., the thermal conduction matrix 731), optionally to an interior portion of a thermal conduction matrix.

In the arrangement 740, various components a1, a3, b1, b2 and b3 are arranged along an upper side and a lower side of a thermal conduction matrix 741 with ends A and B and a heat source exists 742 along the lower side of the thermal conduction matrix 741 that is thermally coupled to the thermal conduction matrix 741, for example, via a thermally conductive material 743. As shown, the components a1 and a3 are thermally coupled to the thermal conduction matrix 741, for example, via thermally conductive material 745 and 747. In such an example, the thermal conduction matrix 741 may be anisotropic with respect to its thermal conductivity, for example, such that the components b1, b2 and b3 are shielded from the heat source 742 and where the components a1 and a3 may be receive heat energy from the heat source 742 via the thermal conduction matrix 741 (e.g., and the materials 743, 745 and 747). In such an example, heat energy from the heat source 742 may be directed towards the ends A and B of the thermal conduction matrix 741 and towards the components a1 and a3. As an example, the components a1 and a3 may benefit from heat energy, for example, they may benefit from an increase in their temperature. As an example, the thermal conduction matrix 741 may be bound by one or more layers of insulation 744 and 746, where a layer or layers may, for example, help to shield the components b1, b2 and b3 from heat energy of the heat source 742. As an example, a thermally conductive material (e.g., the materials 743, 745 and 747) may penetrate one or more layers of insulation (e.g., the insulation 744 and/or the insulation 746) to thermally couple a component to a thermal conduction matrix (e.g., the thermal conduction matrix 741), optionally to an interior portion of a thermal conduction matrix.

Figure 8:
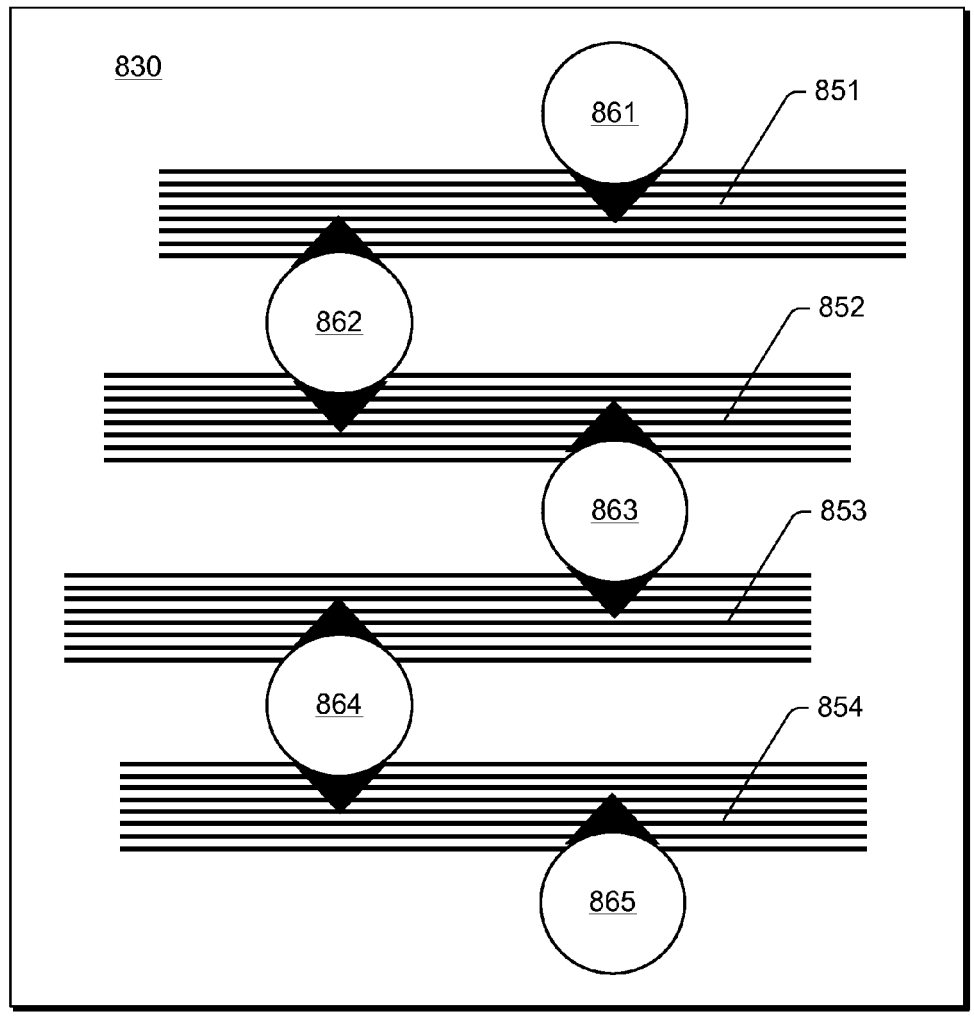
FIG. 8 is a diagram of examples of arrangements and thermal conduction matrixes.

FIG. 8 shows examples of arrangements 830 with respect to thermal conduction matrixes 851, 852, 853 and 854. As shown, interconnects 861, 862, 863, 864 and 865 that thermally connect to one or more thermal conduction matrixes may be included in an arrangement, which may be, for example, part of a device. As an example, an interconnect may thermally couple to one or more thermal conduction matrixes. As an example, an arrangement may provide a three-dimensional scaffold like structure where, for example, interconnects may optionally be offset with respect to each other. As an example, one or more thermal conduction matrixes of a scaffold structure may be offset with respect to one or more other thermal conduction matrixes of the scaffold structure. As an example, a device may include a three-dimensional scaffold structure that includes a plurality of thermal conduction matrixes where various matrixes are thermally coupled by one or more interconnects. In the examples of FIG. 8, the interconnects 861, 862, 863, 864 and 865 may include a spherical shape, a cylindrical shape and/or other shape or shapes.

Figure 9:
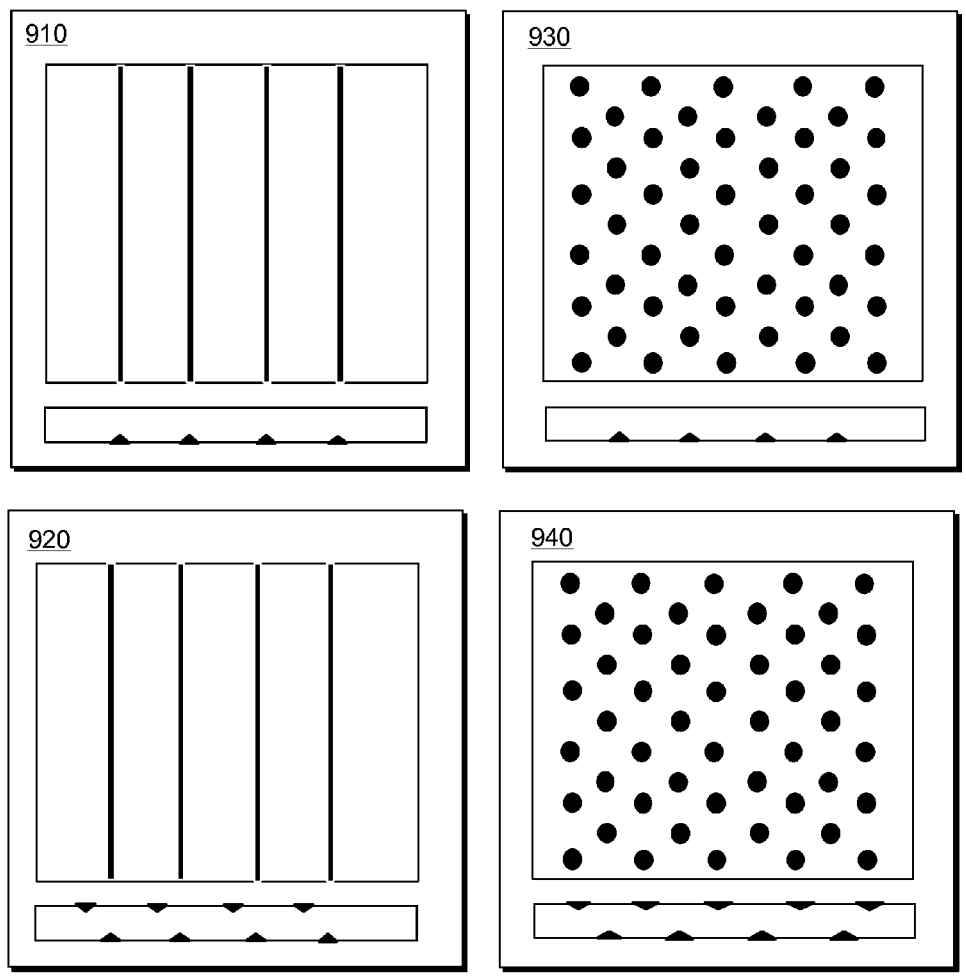
FIG. 9 is a diagram of examples of thermal conduction matrixes.

FIG. 9 is a diagram of examples of thermal conduction matrixes 910, 920, 930 and 940. As shown, the thermal conduction matrix 910 may include a body with longitudinal channels of material, which may include, for example, crystalline carbon formations (e.g., graphite, graphene, etc.). As shown, the thermal conduction matrix 920 may include a body with sets of longitudinal channels of material, which may include, for example, crystalline carbon formations (e.g., graphite, graphene, etc.). As shown, the thermal conduction matrix 930 may include a body with openings occupied by material, which may include, for example, crystalline carbon formations (e.g., graphite, graphene, etc.). As shown, the thermal conduction matrix 940 may include a body with sets of openings occupied by material, which may include, for example, crystalline carbon formations (e.g., graphite, graphene, etc.). As an example one or more of the thermal conduction matrixes 910, 920, 930 and 940 may include a phase change material or phase change materials that may, for example, act to damp temperature changes (e.g., temperature gradients with respect to space and/or time).

Figure 10:
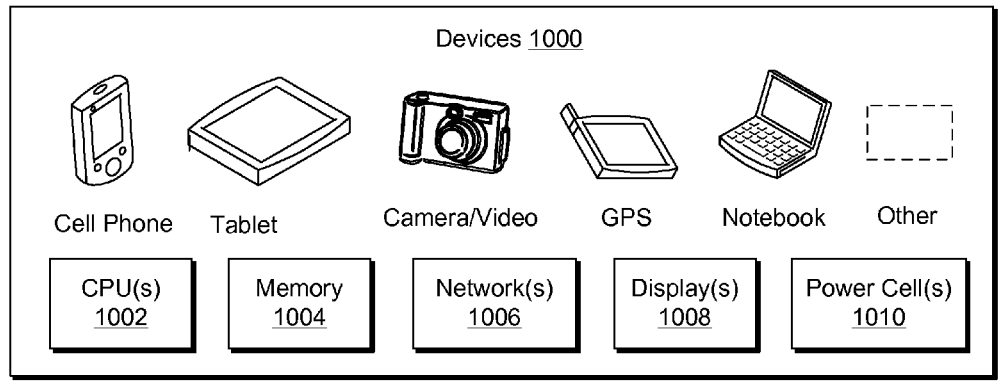
FIG. 10 is a diagram of examples of devices.
Figure 10:
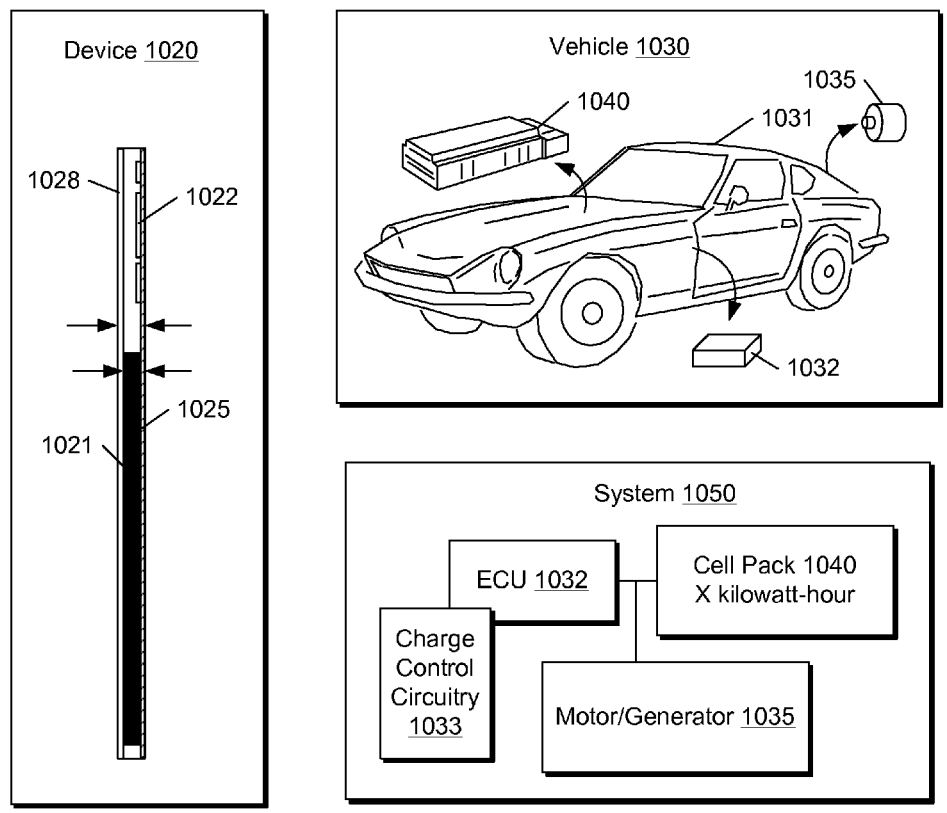

FIG. 10 shows some examples of devices 1000 that include components. As an example, one or more of the devices 1000 may be powered by a lithium-ion cell or cells (e.g., in the form of a lithium-ion battery or batteries). For example, a cell phone, a tablet, a camera, a GPS device, a notebook computer, or other device may be powered by a lithium-ion cell or cells. As to other devices, a device may be an electric motor of an electric vehicle or a hybrid vehicle. A device may be an automobile, a toy, a remote control device (e.g., a bomb sniffers, drones, etc.), etc. A device may include one or more processors 1002, memory 1004, one or more network interfaces 1006, one or more displays 1008 and, as a power source, for example, one or more lithium-ion cells 1010.

As an example, a device 1020 may include a power cell(s) 1021, circuitry 1022, a thermal conduction matrix 1025 and, for example, a display 1028. In such an example, the thickness of the device 1020 may be determined largely by a thickness of the power cell(s) 1021. For example, about 80 percent of the overall thickness of the device 1020 may be determined by a thickness of the power cell(s) 1021. In such an example, the power cell(s) 1021 may include dimensions for height (e.g., thickness), length and width where the length and width may exceed the height. In such an example, the power cell(s) 1021 may be modeled as a thin plate, for example, as to stress, strain, etc. For example, a heat source in the device 1020 may be local in that it causes a hot spot for the power cell(s) 1021. In such an example, the hot spot may introduce stress due to thermal expansion and/or the hot spot may cause spatial and/or temporal unevenness as to one or more chemical reactions in the power cell(s) 1021. As an example, the thermal conduction matrix 1025 may be included in the device 1020 to distribute heat energy to diminish temperature differentials in the device 1020, for example, with respect to the power cell(s) 1021. As an example, the thermal conduction matrix 1025 may include graphene, optionally as a continuous layer or layers. As an example, a thermal conduction matrix may include one or more layers of graphene paper. In such an example, graphene paper may add integrity to the device 1020, for example, integrity as to resistance to shock, resistance to puncture, resistance to swelling in the instance that the one or more power cell(s) 1021 might swell, etc. As an example, the thermal conduction matrix 1025 may be anchored to one or more components of the device 1020. For example, a thermal conduction matrix may be anchored to a cover, a housing, a display component, etc. As an example, the thermal conduction matrix 1025 may include one or more phase change materials.

As an example, a cell (e.g., or cells) may be characterized as to specific energy (e.g., Wh/kg or MJ/kg), energy density (Wh/l or MJ/l), specific power (W/kg), etc. As an example, a region of a battery with one or more cells may include $L_{Cell}$ and $W_{Cell}$ dimensions (e.g., rectangular dimensions), for example, with a $L_{Cell}/W_{Cell}$ ratio in a range of about 1 to about 5. As an example, consider a cell (or cells) with dimensions of about 120 mm ($L_{Cell}$) by about 100 mm ($W_{Cell}$) where, in combination with a height ($H_{Cell}$), a volume ($Vol_{Cell}$) may be calculated. As an example, with a volume ($Vol_{Cell}$) and energy density (ED in Wh/l), an energy value (e.g., Wh) may be determined for the battery.

As an example, a battery with a volume of about 43 ml (~43,000 cubic mm) and a thickness ($H_{Cell}$) of about 3.6 mm (e.g., with $L_{Cell}$ and $W_{Cell}$ of about 120 mm and about 100 mm) may have an energy density of about 480 Wh/l. In terms of energy, such a battery may be capable of storing about 21 Wh, which may be sufficient to power 2.6 W circuitry for about 8 hours (e.g., circuitry operational time). In such an example, where the circuitry and battery are housed in a housing (e.g., a device housing), the thickness of the housing may be expected to be greater than about 3.6 mm. As an example, consider an effort to make the same device with a battery having a thickness ($H_{Cell}$) of about 2 mm.

As an example, a thermal conduction matrix may include one or more layers of graphene. As an example, graphene may be included in a thermal conduction matrix as one or more layers of graphene paper. As an example, a layer of graphene paper may include a thickness of about the order of microns (e.g., about 3 microns to about 10 microns or optionally more). As an example, a device may include a thermal conduction matrix with a thickness of about the order of several millimeters or optionally less. As an example, a device may include a thermal conduction matrix with a thickness of less than about 1 mm. As an example, a thermal conduction matrix may include a phase change material (e.g., optionally encapsulated).

FIG. 10 also shows an example of a vehicle 1030 that includes an engine control unit (ECU) 1032, a cell pack 1040 and an electric motor and generator 1035 and an example of a system 1050 for the vehicle 1030 that includes the ECU 1032, the cell pack 1040, the electric motor and generator 1035 and charge control circuitry 1033 (e.g., which may be part of the ECU 1032). The vehicle 1030 may include, for example, one or more processors, memory, etc.

As an example, the vehicle 1030 may be a hybrid electric vehicle (HEV) where the cell pack 1040 is rated at about 1.4 kWh, for example, to absorb braking energy for immediate re-use in an acceleration cycle (e.g., using the electric motor and generator 1035 as a generator in a regenerative braking scheme). As an example, the vehicle 1030 may be a plug-in hybrid electric vehicle (PHEV) where the cell pack 1040 is rated at about 5.2 to 16 kWh, for example, to offer both hybrid and electric drive functions. As an example, the vehicle 1030 may be a battery electric vehicle (BEV) where the cell pack 1040 is rated at about 24 to 85 kWh to propel the vehicle 1030.

As an example, the cell pack 1040 may include one or more thermal conduction matrixes, for example, to achieve a more uniform environment for the cell pack 1040 (e.g., more uniform spatially, temporally and/or spatially and temporally).

As an example, a system may include a processor; memory operatively coupled to the processor; lithium-ion battery cells to power at least the processor and the memory; and a thermal conduction matrix that includes crystalline carbon formations that distribute heat energy generated by the lithium-ion battery cells. In such an example, the thermal conduction matrix may include channels where at least a portion of the crystalline carbon formations are disposed in the channels. As an example, a thermal conduction matrix may include apertures where at least a portion of crystalline carbon formations are disposed in the apertures. As an example, a crystalline carbon formation may be or include graphene. As an example, a crystalline carbon formation may be or include graphite. As an example, a crystalline carbon formation may be anisotropic.

As an example, a crystalline carbon formation or formations may include directional thermal conductivities that, for two different directions, differ by at least one order of magnitude (e.g., optionally by at least two orders of magnitude).

As an example, a system may include lithium-ion battery cells and a thermal conduction matrix that covers at least a portion of the lithium-ion battery cells. As an example, crystalline carbon formations in a thermal conduction matrix may include a pattern based at least in part on operational heat generation of one or more lithium-ion battery cells. In such an example, lithium-ion battery cells may include an interior cell that includes neighboring cells where a pattern increases thermal conduction for interior cell.

As an example, a thermal conduction matrix may have or include a planar form. As an example, a system may include a housing where a thermal conduction matrix includes anchor points for anchoring the thermal conduction matrix to the housing. As an example, a thermal conduction matrix may include a continuous layer of crystalline carbon. As an example, a continuous layer of crystalline carbon may be or include graphene paper.

As an example, a system may include a processor; memory operatively coupled to the processor; a display operatively coupled to the processor; lithium-ion battery cells to power at least the processor, the memory and the display; and a thermal conduction matrix that includes crystalline carbon formations that distribute heat energy generated by the lithium-ion battery cells. As an example, in an operational state of a system, a thermal conduction matrix may reduce thermal gradients associated with one or more components, which may be or include one or more lithium-ion battery cells.

As an example, a method may include operating a system that includes a processor; memory operatively coupled to the processor; lithium-ion battery cells to power at least the processor and the memory; and a thermal conduction matrix that comprises crystalline carbon formations; generating heat energy by the lithium-ion battery cells; and distributing the heat energy via the thermal conduction matrix to reduce thermal gradients associated with the lithium-ion battery cells. In such a method, the distributing may reduce thermal stresses associated with the lithium-ion battery cells.

As an example, a battery may include lithium-ion cells; and a thermal conduction matrix that includes crystalline carbon formations that distribute heat energy generated by the lithium-ion battery cells. In such an example, the thermal conduction matrix may include graphene paper. As an example, a thermal conduction matrix may reduce thermal gradients (e.g., spatially, temporally and/or spatially and temporally) and may add integrity to a battery. For example, where a battery may swell, a thermal conduction matrix may restrain and/or constrain expansion of the battery, which may be, for example, in a package. As an example, a thermal conduction matrix may constrain swelling to one or more directions that may avoid damage to a device (e.g., housing, system, etc.) in which a battery is housed. As an example, swelling may be constrained to one or more planar directions, which may help to avoid an increase in thickness, which may cause a device to pop open or otherwise distort.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium. As an example, a computer-readable medium may be a computer-readable medium that is not a carrier wave.

Figure 11:
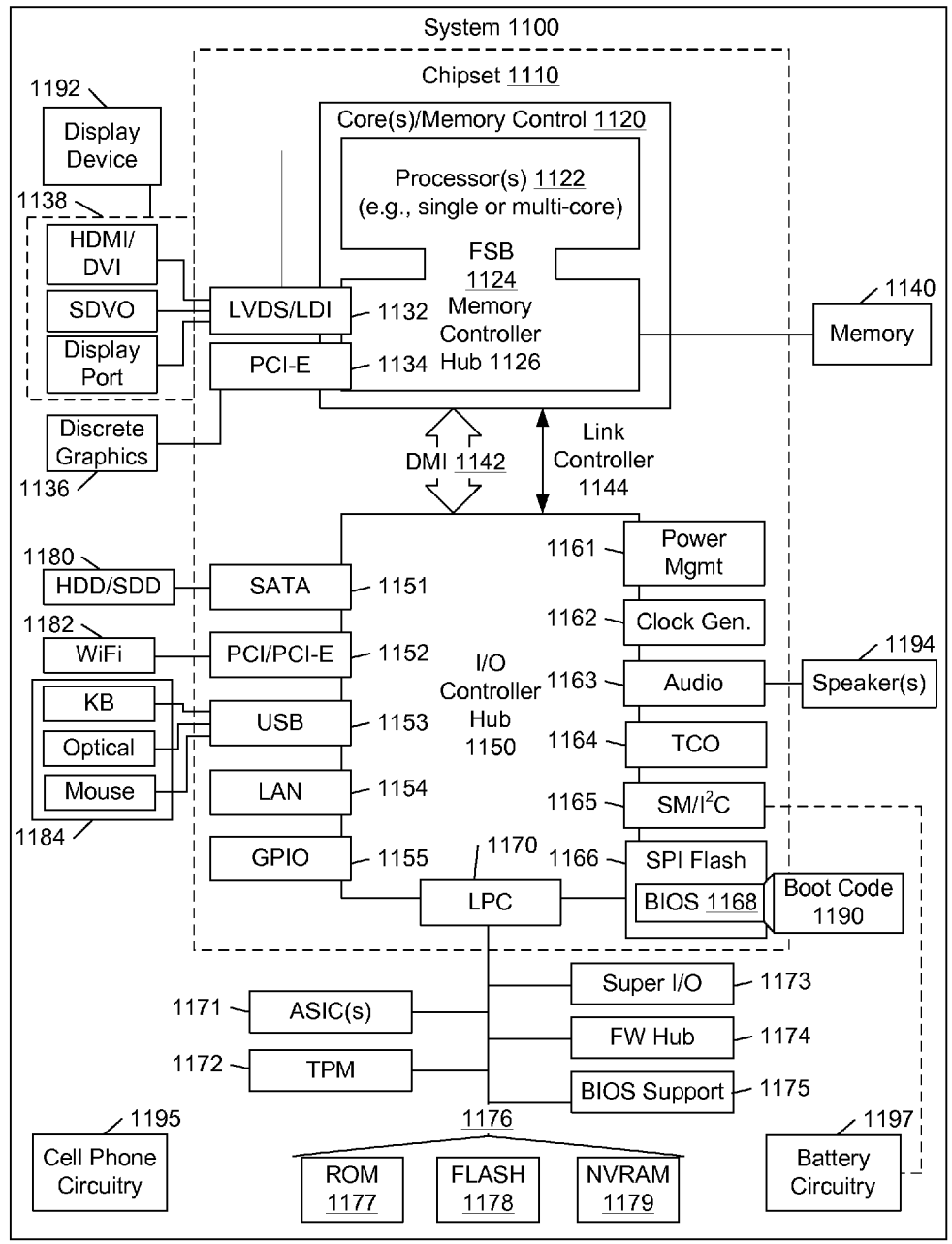
FIG. 11 is a diagram of an example of a system that includes one or more processors.

While various examples of circuits or circuitry have been discussed, FIG. 11 depicts a block diagram of an illustrative computer system 1100. The system 1100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 1100. As described herein, a device such as one of the devices 1000 of FIG. 10 may include at least some of the features of the system 1100.

As shown in FIG. 11, the system 1100 includes a so-called chipset 1110. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 11, the chipset 1110 has a particular architecture, which may vary to some extent depending on brand or manufacturer. The architecture of the chipset 1110 includes a core and memory control group 1120 and an I/O controller hub 1150 that exchange information (e.g., data, signals, commands, etc.) via, for example, a direct management interface or direct media interface (DMI) 1142 or a link controller 1144. In the example of FIG. 11, the DMI 1142 is a chip-to-chip interface (sometimes referred to as being a link between a "northbridge" and a "southbridge").

The core and memory control group 1120 include one or more processors 1122 (e.g., single core or multi-core) and a memory controller hub 1126 that exchange information via a front side bus (FSB) 1124. As described herein, various components of the core and memory control group 1120 may be integrated onto a single processor die, for example, to make a chip that supplants the conventional "northbridge" style architecture.

The memory controller hub 1126 interfaces with memory 1140. For example, the memory controller hub 1126 may provide support for DDR SDRAM memory (e.g., DDR, DDR2, DDR3, etc.). In general, the memory 1140 is a type of random-access memory (RAM). It is often referred to as "system memory".

The memory controller hub 1126 further includes a low-voltage differential signaling interface (LVDS) 1132. The LVDS 1132 may be a so-called LVDS Display Interface (LDI) for support of a display device 1192 (e.g., a CRT, a flat panel, a projector, etc.). A block 1138 includes some examples of technologies that may be supported via the LVDS interface 1132 (e.g., serial digital video, HDMI/DVI, display port). The memory controller hub 1126 also includes one or more PCI-express interfaces (PCI-E) 1134, for example, for support of discrete graphics 1136. Discrete graphics using a PCI-E interface has become an alternative approach to an accelerated graphics port (AGP). For example, the memory controller hub 1126 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1150 includes a variety of interfaces. The example of FIG. 11 includes a SATA interface 1151, one or more PCI-E interfaces 1152 (optionally one or more legacy PCI interfaces), one or more USB interfaces 1153, a LAN interface 1154 (more generally a network interface), a general purpose I/O interface (GPIO) 1155, a low-pin count (LPC) interface 1170, a power management interface 1161, a clock generator interface 1162, an audio interface 1163 (e.g., for speakers 1194), a total cost of operation (TCO) interface 1164, a system management bus interface (e.g., a multi-master serial computer bus interface) 1165, and a serial peripheral flash memory/controller interface (SPI Flash) 1166, which, in the example of FIG. 11, includes BIOS 1168 and boot code 1190. With respect to network connections, the I/O hub controller 1150 may include integrated gigabit Ethernet controller lines multiplexed with a PCI-E interface port. Other network features may operate independent of a PCI-E interface.

The interfaces of the I/O hub controller 1150 provide for communication with various devices, networks, etc. For example, the SATA interface 1151 provides for reading, writing or reading and writing information on one or more drives 1180 such as HDDs, SDDs or a combination thereof. The I/O hub controller 1150 may also include an advanced host controller interface (AHCI) to support one or more drives 1180. The PCI-E interface 1152 allows for wireless connections 1182 to devices, networks, etc. The USB interface 1153 provides for input devices 1184 such as keyboards (KB), one or more optical sensors, mice and various other devices (e.g., microphones, cameras, phones, storage, media players, etc.). On or more other types of sensors may optionally rely on the USB interface 1153 or another interface (e.g., I²C, etc.). As to microphones, the system 1100 of FIG. 11 may include hardware (e.g., audio card) appropriately configured for receipt of sound (e.g., user voice, ambient sound, etc.).

In the example of FIG. 11, the LPC interface 1170 provides for use of one or more ASICs 1171, a trusted platform module (TPM) 1172, a super I/O 1173, a firmware hub 1174, BIOS support 1175 as well as various types of memory 1176 such as ROM 1177, Flash 1178, and non-volatile RAM (NVRAM) 1179. With respect to the TPM 1172, this module may be in the form of a chip that can be used to authenticate software and hardware devices. For example, a TPM may be capable of performing platform authentication and may be used to verify that a system seeking access is the expected system.

The system 1100, upon power on, may be configured to execute boot code 1190 for the BIOS 1168, as stored within the SPI Flash 1166, and thereafter processes data under the control of one or more operating systems and application software (e.g., stored in system memory 1140). An operating system may be stored in any of a variety of locations and accessed, for example, according to instructions of the BIOS 1168. Again, as described herein, a satellite, a base, a server or other machine may include fewer or more features than shown in the system 1100 of FIG. 11. Further, the system 1100 of FIG. 11 is shown as optionally include cell phone circuitry 1195, which may include GSM, CDMA, etc., types of circuitry configured for coordinated operation with one or more of the other features of the system 1100. Also shown in FIG. 11 is battery circuitry 1197, which may provide one or more battery, power, etc., associated features (e.g., optionally to instruct one or more other components of the system 1100). As an example, a SMBus may be operable via a LPC (see, e.g., the LPC interface 1170), via an I²C interface (see, e.g., the SM/I²C interface 1165), etc.

CONCLUSION

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A system comprising:
a housing;
components that comprise at least a processor, memory operatively coupled to the processor, and a display operatively coupled to the processor;
lithium-ion battery cells, disposed in the housing, to power at least the processor and the memory;
a thermal conduction matrix disposed in the housing in an x,y-plane wherein the thermal conduction matrix comprises crystalline carbon formations wherein thermal conductivity of the crystalline carbon formations is greater in the x,y-plane than in a z-direction;
an insulation layer in contact with the thermal conduction matrix and disposed in an x,y-plane;
at a first x,y location, a first region of thermally conductive material that penetrates the insulation layer in a z-direction; and
at a second x,y location, a second region of thermally conductive material that penetrates the insulation layer in a z-direction,
wherein at least one of the lithium-ion battery cells is at a position on at least one of the first and second x,y locations,
wherein the first region of thermally conductive material, the second region of thermally conductive material and a portion of the crystalline carbon formations define a thermal conduction path between the first and second x,y locations.

2. The system of claim 1 wherein the thermal conduction matrix comprises channels wherein at least a portion of the crystalline carbon formations are disposed in the channels.

3. The system of claim 1 wherein the crystalline carbon formations comprise graphene.

4. The system of claim 1 wherein the crystalline carbon formations comprise graphite.

5. The system of claim 1 wherein the crystalline carbon formations are anisotropic.

6. The system of claim 1 wherein the thermal conductivity of the crystalline carbon formations comprises directional thermal conductivities that, for the x,y-plane and the z-direction, differ by at least one order of magnitude.

7. The system of claim 1 wherein the thermal conduction matrix covers the lithium-ion battery cells.

8. The system of claim 1 wherein the crystalline carbon formations comprise a pattern based at least in part on operational heat generation of the lithium-ion battery cells.

9. The system of claim 8 wherein the lithium-ion battery cells comprise an interior cell that comprises neighboring cells wherein the pattern increases thermal conduction for interior cell.

10. The system of claim 1 wherein the thermal conduction matrix comprises an encapsulated phase change material.

11. The system of claim 1 wherein the thermal conduction matrix comprises anchor points for anchoring the thermal conduction matrix to the housing.

12. The system of claim 1 wherein the thermal conduction matrix comprises a continuous layer of crystalline carbon.

13. The system of claim 12 wherein the continuous layer of crystalline carbon comprises graphene paper.

14. The system of claim 1 wherein, in an operational state of the system, the thermal conduction matrix reduces thermal gradients associated with the lithium-ion battery cells.

15. A battery comprising:
lithium-ion cells;
a thermal conduction matrix disposed in an x,y-plane wherein the thermal conduction matrix comprises crystalline carbon formations wherein thermal conductivity of the crystalline carbon formations is greater in the x,y-plane than in a z-direction;
an insulation layer in contact with the thermal conduction matrix and disposed in an x,y-plane;
at a first x,y location, a first region of thermally conductive material that penetrates the insulation layer in a z-direction; and
at a second x,y location, a second region of thermally conductive material that penetrates the insulation layer in a z-direction,
wherein at least one of the lithium-ion cells is at a position on at least one of the first and second x,y locations,
wherein the first region of thermally conductive material, the second region of thermally conductive material and a portion of the crystalline carbon formations define a thermal conduction path between the first and second x,y locations.

16. The battery of claim 15 wherein the thermal conduction matrix comprises graphene paper.

17. The system of claim 1 wherein the thermally conductive material comprises metal.

18. The system of claim 1 wherein the thermally conductive material comprises an alloy.

19. The system of claim 1 comprising a length of thermally conductive material that penetrates the insulation layer and that extends between two ends of the thermal conduction matrix.

20. The system of claim 19 wherein the length of thermally conductive material is curved.

* * * * *